United States Patent [19]

Davis

[11] Patent Number: 4,757,540
[45] Date of Patent: Jul. 12, 1988

[54] METHOD FOR AUDIO EDITING

[75] Inventor: Neil R. Davis, Fairfax, Va.

[73] Assignee: E-Systems, Inc., Dallas, Tex.

[21] Appl. No.: 544,493

[22] Filed: Oct. 24, 1983

[51] Int. Cl.$^4$ .............................................. G10L 5/00
[52] U.S. Cl. ...................................... 381/34; 360/13; 369/83
[58] Field of Search .................................. 381/34–38; 360/13, 14.3; 369/83

[56] References Cited

U.S. PATENT DOCUMENTS

| 3,369,077 | 2/1968 | French et al. | 381/38 |
| 4,464,784 | 8/1984 | Agnello | 381/34 |
| 4,586,137 | 4/1986 | Frost, Jr. et al. | 364/422 |

OTHER PUBLICATIONS

Rabiner, L., *Digital Processing of Speech Signals*, Prentice Hall 1978, pp. 147–149.

*Primary Examiner*—Emanuel S. Kemeny
*Attorney, Agent, or Firm*—Albert M. Crowder, Jr.

[57] ABSTRACT

A method for determining an acceptable splice point is provided to facilitate splicing of a first segment of an audio signal to a second segment thereof. According to the method, an audio signal is converted into a sequence of samples and first and second edit points are selected along the sequence. The first edit point represents a nominal ending point of the first audio segment, and the second edit point represents a nominal starting point of the second audio segment. According to the method, a plurality of samples in a correlation window following the first edit point are weighted and correlated with a plurality of weighted samples in a correlation window following the second edit point for each position of the second edit point. The position of the second edit point is then shifted to the next sample in the sequence. After the correlation is calculated for each position of the second edit point, the location of an acceptable splice point can be determined. Specifically, if an average magnitude difference function (AMDF) is utilized for the correlation, the position of an acceptable splice point is that position of the second edit point which produces a minimum AMDF. However, if a cross correlation function (CCF) is utilized for the correlation, the position of an acceptable splice point is that position of the second edit point which produces a maximum CCF.

8 Claims, 2 Drawing Sheets

4,757,540

METHOD FOR AUDIO EDITING

TECHNICAL FIELD

The present invention relates generally to audio editing and particularly to an improved method for determining an acceptable splice point to facilitate splicing of a first segment of an audio signal to a second segment thereof.

BACKGROUND OF THE INVENTION

Audio editing techniques are well-known in the prior art. For example, in analog audio editing, sections of a recorded analog signal are simply "cut" and "spliced" together. The creation of digital audio allowed this cut and splice operation to be "smoothed over" through the use of an averaging technique wherein audio samples on either side of a splice point are averaged together. Such techniques, however, result in undesirable signal discontinuities which introduce audible clicks or pops during signal playback.

Recently, "intelligent" digital audio editing techniques have been developed which facilitate selection of splice points along a sequence of digital samples representing an audio signal. In such techniques, a desired splice point is selected by an operator. A processor-based system is then utilized to scan subsequent samples for a sample close to this splice point satisfying various slope, slope change, noise, or RMS level criteria. Although this approach has produced an improved product as compared to prior methods, the criteria selection schemes employed thereby are too easily affected by noise or by the normal signal fluctuations in speech.

Therefore, there is a need for an improved technique for selecting splice points along a sequence of analog or digital samples that preserves the general waveshape of the audio signal after editing, and which is relatively unaffected by noise and normal signal fluctuations in speech.

SUMMARY OF THE INVENTION

The present invention describes a method for determining an acceptable splice point to facilitate splicing of a first segment of an audio signal to a second segment thereof. As used herein, the term "acceptable splice point" refers to a point within the second segment that, upon being spliced to the first segment, maintains the general waveshape of the audio signal. The method uses an average magnitude difference function (AMDF) or a cross correlation function (CCF) to determine an acceptable splice point in a given region of the second segment by judging the correlation between samples to be spliced in with the samples which would have been in the signal if there was no editing. In accordance with a first embodiment of the method, an audio signal is converted into a sequence of samples and first and second edit points along the sequence are selected. The first edit point represents a nominal ending point of a first audio segment and the second edit point represents a nominal starting point of a second audio segment. A plurality of samples in a correlation window following the first edit point are then correlated with a corresponding number of samples in a correlation window following the second edit point to produce an average magnitude difference function for the specific position of the second edit point. Thereafter, the position of the second edit point is shifted to the next sample in the sequence and the correlation step is repeated. After a predetermined number of samples following the second edit point have been correlated in this manner, the acceptable splice point is that position of the second edit point for which the average magnitude difference function is minimized.

In accordance with an alternate embodiment of the present invention, the audio signal is converted into a sequence of samples and first and second edit points along the sequence are selected. A plurality of samples in a correlation window following the first edit point are then correlated with a corresponding number of samples in a correlation window following the second edit point to produce a cross correlation function (CCF) for the specific position of the second edit point. The position of the second edit point is then shifted to the next sample in the sequence and the correlation step is repeated. After a predetermined number of samples following the second edit point have been correlated in this manner, the acceptable splice point is that position of the second edit point for which the cross correlation function is maximized.

In accordance with another feature of the invention, either the average magnitude difference function or cross correlation function can be a "weighted" correlation, wherein greater weights are assigned to samples closer to the edit points.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1A:
FIGS. 1a–1d show the results of splicing together audio segments along a waveform according to the prior art and to the method of the present invention.
Figure 1B:
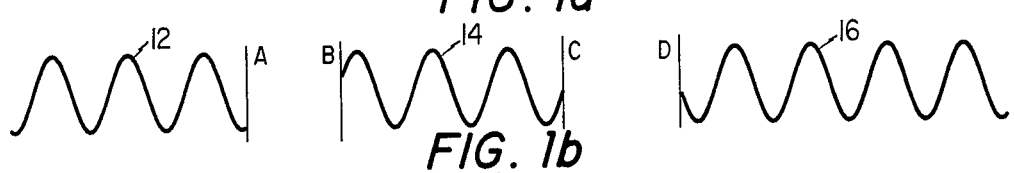
Figure 1C:
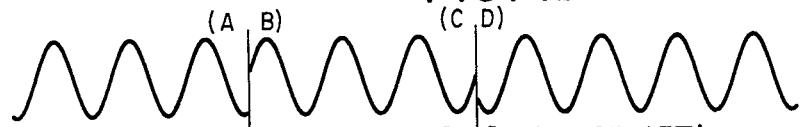

Referring now to the drawings, FIG. 1a discloses an audio signal waveform 10 to be edited, which for the purposes of example is shown as a sine wave. As seen in FIG. 1b, the audio signal waveform 10 includes three segments 12, 14 and 16, desired to be spliced together. The first audio segment 12 has a nominal ending point A to be joined to the nominal starting point B of the second audio segment 14. Likewise, the second audio segment 14 has a nominal ending point C to be joined to the nominal starting point D of the third audio segment 16. In accordance with prior art audio editing schemes, the audio signal waveform 10 is simply "cut" and "spliced" at the nominal start and end points as shown in FIG. 1c. This technique results in undesirable signal discontinuities represented by the splice points (A, B) and (C, D). Such discontinuities introduce audible clicks or pops during the playback of the audio signal. The discontinuities shown in FIG. 1c also exist in digital audio editing although the cut and splice operation therein is "smoothed over" by averaging audio samples on either side of the splice points. Moreover, even "intelligent" digital audio editing techniques, i.e., techniques wherein splice-point selection is based on slope, slope change, noise, or level criteria, produce undesirable signal discontinuities since they are easily affected by noise or normal signal fluctuations in speech.

Figure 1D:
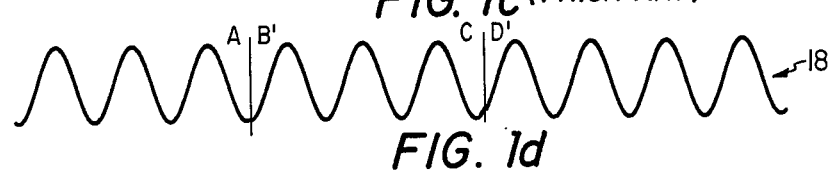

To ameliorate these problems, the method of the present invention determines an acceptable splice point by judging the correlation between samples to be spliced in with samples which would have been at the splice location in the signal if there was no editing. This method results in an edited audio signal 18 as shown in FIG. 1d having the same general waveshape at the respective splice points as the audio signal waveform 10. As seen in FIG. 1d, the splice points (A, B') and (C, D') are located according to the method of the present invention to remove undesirable signal discontinuities in the edited audio signal.

Figure 2A:
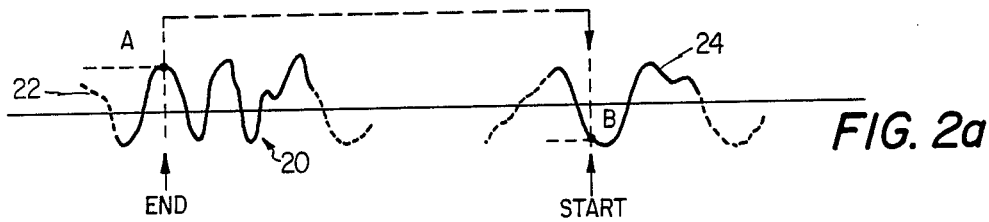
FIGS. 2a–2d show an analog audio signal waveform and how a plurality of samples following a first edit point thereof are correlated with a plurality of samples following a second edit point thereof according to the present invention.

Referring now to FIGS. 2a–2d, a real-time analog audio signal waveform 20 is shown having a first audio segment 22 and a second audio segment 24 which are desired to be spliced together. As seen in FIG. 2a, the first audio segment 22 includes a nominal ending point A having a positive amplitude. Similarly, the second audio segment 24 has a nominal starting point B having a negative amplitude. If the first and second audio segments 22 and 24 were spliced together at the points A and B, a large signal discontinuity would appear at this splice point as discussed above with respect to FIG. 1c. In accordance with the method of the invention, such undesirable signal discontinuities are avoided through the determination of an acceptable splice point in a given region by a correlation scheme. In particular, a correlation is performed between the samples to be spliced in with the samples which would have been at the splice location if there was no editing. This method preserves the general waveshape of the audio signal after the edit.

Figure 2B:
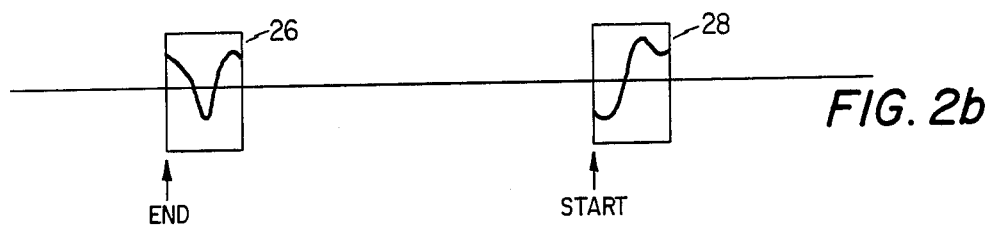
Figure 2C:
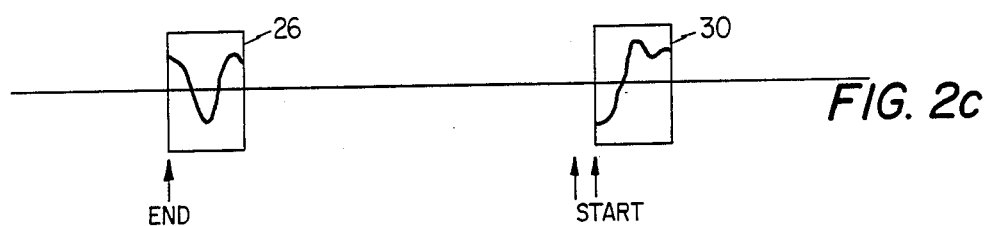
Figure 2D:
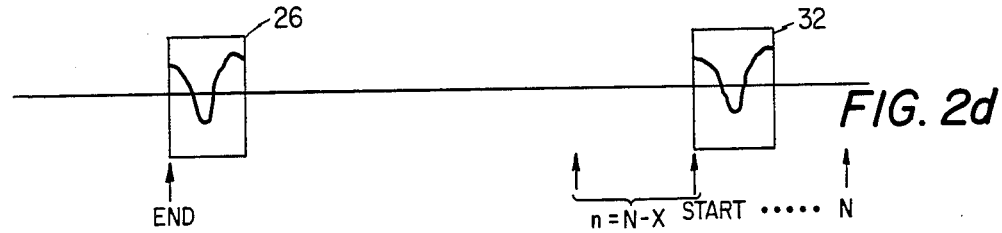

According to the method, first and second edit points A and B along the audio signal are selected by an operator. This selection process can be effected in a variety of ways, such as operator-input of parameters via a keyboard during a prompting scheme. As discussed above with respect to FIG. 2a, the first edit point A represents the nominal ending point of the first audio segment 22. Likewise, the second edit point B represents the nominal starting point of the second audio segment 24. Referring now to FIG. 2b, according to the method of the present invention, a portion of the audio signal located in a correlation window 26 following the first edit point A is correlated with a portion of the audio signal located in a correlation window 28 following the second edit point B. The correlation windows 26 and 28, which are merely arbitrary conventions to facilitate the correlation step, may be of any desired length as determined by a software routine or operator-inputted parameters. The portion of the audio signal within the correlation window 26 represents that portion of the audio signal that would have been in the signal if there was no editing. As will be described in more detail below, the correlation between the portions of the audio signal in the correlation windows 26 and 28 produces a summation value depending on the type of correlation scheme utilized. Once this value has been calculated, the position of the second edit point B is shifted along the audio signal to the position shown in FIG. 2c. The correlation step is then repeated utilizing the correlation windows 26 and 30 to form a new summation value for the second edit point. As seen in FIG. 2d, in the preferred embodiment the correlation step is then continued for N cycles to produce N summation values. The value of N can be predetermined by a software routine or variable based on operator-inputted parameters.

The method of the present invention thus preserves the general waveshape of the audio signal by judging the correlation between successive portions of the second audio segment with the samples which would have been in the audio signal if there was no editing. The samples which would have been in the audio signal are represented by the portion of the audio signal in correlation window 26 of FIGS. 2b–2d.

In the preferred embodiment, the correlation step is continued for N cycles to produce N summation values. Somewhere along the second segment there will be an acceptable splice point which can then be determined. Referring back to FIG. 2d, it can be seen that at cycle $n = N - X$ the portion of the second audio segment is highly correlated with that portion of the audio signal which would have been in the signal if there was no editing. Thus, position $N - X$ of the second edit point is acceptable as a splice location along the second segment. In particular, FIG. 2d shows that the portions of the analog signal in the correlation windows 26 and 32 are similar. First and second audio segments spliced together at these points will preserve the general waveshape of the edited audio signal.

Figure 3:
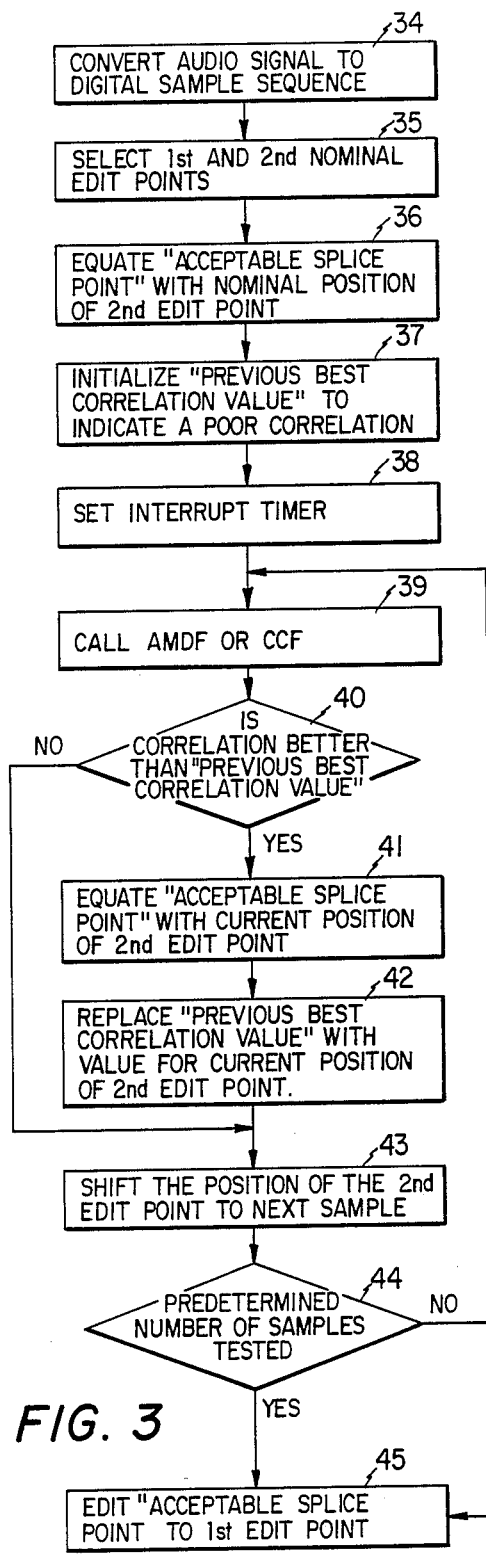
FIG. 3 is a flow chart describing generally the method of the present invention for determining an acceptable splice point to facilitate splicing of a first audio segment to a second audio segment.

Referring now to FIG. 3, a flow chart is shown describing the method of the present invention wherein an acceptable splice point is determined to facilitate splicing of a first segment of an audio signal to a second segment thereof. The method begins at step 34 where the audio signal is converted to a digital sample sequence. In step 35, first and second edit points are selected along the sequence. As discussed above with respect to FIGURE 2a, the first edit point represents the nominal ending point A of the first audio segment 22, and the second edit point represents the nominal starting point B of the second audio segment 24. Referring back to FIG. 3, the method continues with step 36 to initialize an "acceptable splice point" variable. Specifically, this variable is equated with the nominal position of the second edit point. In particular, in the preferred embodiment of the invention the nominal position of the second edit point is considered the "acceptable splice point" unless the AMDF or CCF calculation for a new position thereof indicates a better correlation.

Returning to the flowchart of FIG. 3, the method continues with step 37 to initialize a "previous best correlation value" variable to represent a poor correlation. A "poor correlation" is a correlation which produces a large value for the AMDF, or a small value for the CCF. By step 38, an interrupt timer is set to establish a predetermined time in which samples will be correlated. In step 38, the method calls either the AMDF or CCF correlation scheme to correlate a plurality of samples following the first edit point with a corresponding number of samples following the second edit point. In particular, the plurality of samples following the first and second edit points are located in correlation windows, such as the windows 26 and 28 shown in FIG. 2b. As discussed above, the correlation of the plurality of samples within the correlation windows produces either an AMDF or a CCF summation value for each specific position of the second edit point.

In step 40, a test is made to determine whether the current correlation value is better, i.e., indicates a more acceptable splice point, than the "previous best correlation value" set in step 37. If so, the "acceptable splice point" is equated with the current position of the second edit point. The method then continues in step 42 to replace the "previous best correlation value" with the correlation value produced for the current position of the second edit point. Therefore, according to the method the nominal second edit point is considered the "acceptable splice point" unless the AMDF or CCF calculation for a new position thereof indicates a better correlation. The value of this better correlation is then utilized for the "previous best correlation value" in step 42.

The method continues with step 43 wherein the position of the second edit point is shifted to the next sample in the digital sample sequence. Step 43 is represented in FIG. 2c where a start pointer is shifted to form a new correlation window. Following the shifting of the second edit point, the method enters inquiry 44 to determine whether a predetermined number of samples following the second edit point have been tested. More specifically, in the preferred embodiment, the search for a "match" with the portion of the audio signal following the nominal ending point of the first audio segment continues only for a predetermined number of samples (i.e., N cycles of correlation) following the second edit point. If the predetermined number of samples has not been tested, the method returns to step 39 to correlate the plurality of samples following the first edit point with the plurality of samples following the "new" second edit point. However, if the predetermined number of samples has been tested, the method continues to step 45 wherein the "acceptable splice point" is then edited to the first edit point.

As discussed above, by step 38 of FIG. 3 an interval timer is set to define a predetermined time period for the correlation. In particular, it should be recognized that the method of the present invention may be run simultaneously with other tasks by a microprocessor. Therefore, according to the present invention the interrupt timer can be set by the microprocessor to ensure that the method does not monopolize the available processing time thereof. When the interval timer "times-out," as represented by step 46 in FIG. 3, the method continues in step 45 by editing the "acceptable splice point" to the first edit point. This editing occurs even if there is not enough time to search through N samples of the digital sample sequence.

According to the method of the present invention, either of two correlation schemes are utilized to determine an acceptable splice point along the audio signal. One correlation scheme calculates an average magnitude difference function (AMDF) for each position of the second edit point. In this embodiment, the position of an acceptable splice point is that position of the second edit point for which the AMDF is minimized. In an alternate embodiment, the correlation scheme calculates a cross correlation function (CCF) for each position of the second edit point along the sample sequence. In this embodiment, the position of the acceptable splice point is that position of the second edit point for which the CCF is maximized.

Figure 4:
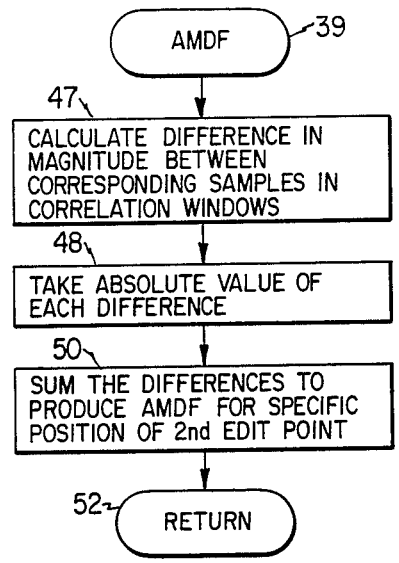
FIG. 4 is a flow chart describing the average magnitude difference function (AMDF) utilized in the method of FIG. 3.
Figure 5:
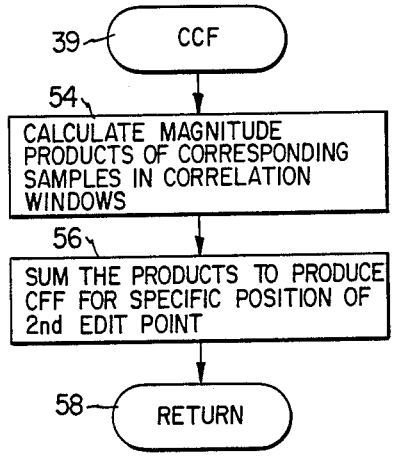
FIG. 5 is a flow chart describing the cross correlation function (CCF) utilized in the method of FIGURE 3.

Referring now to FIGS. 4 and 5, flow charts for the correlation schemes of the present invention are shown in detail. The AMDF and CCF functions are defined as:

$$AMDF(n) = \sum_{j=1}^{W} S_1(j) - S_2(j + n), n = 0 \text{ to } N - 1 \quad (1)$$

$$CCF(n) = \sum_{j=1}^{W} S_1(j)S_2(j + n), n = 0 \text{ to } N - 1 \quad (2)$$

where:
W is the size of the correlation window;
n is the number of samples that the correlation window 28 is shifted to determine the position of the acceptable splice point;
$S_1(j)$ is the jth audio sample of the first audio segment;
$S_2(j)$ is the jth audio sample of the second audio segment; and
N is the predetermined number of samples searched beyond the nominal starting point.

The number of samples which the second edit point is moved to determine the acceptable splice point is given by the value of n which results in a minimum AMDF, or a maximum CCF.

Referring now to FIG. 4, a flow chart of the AMDF correlation scheme is shown in detail. This correlation scheme is step 38 in FIG. 3. The AMDF scheme begins, i.e., with n=0, in step 47 wherein the difference in magnitude between corresponding samples in the correlation windows are calculated. In particular, the magnitude of the first sample in the correlation window following the first edit point is differenced from the magnitude of the first sample in the correlation window following the second edit point. This step is represented in equation (1) above as:

$$S_1(j) - S_2(j+n) \quad (3)$$

Referring back to FIG. 4, the absolute value of this difference is then calculated in step 48 and added to a summation value in step 50. Similarly, the magnitude of the second sample in the correlation window following the first edit point is differenced from the magnitude of the second sample in the correlation window following the second edit point, and so forth for each corresponding set of samples in the windows. The absolute value of these differences are also added to the AMDF summation value to produce the average magnitude difference function for the specific position of the second edit point. Thereafter, the AMDF scheme returns at step 52 and the position of the second edit point is then shifted, i.e., n=1, to the next sample as represented by step 43 of FIG. 3. An AMDF summation value is produced in this manner for each position of the second edit point along the sample sequence.

Referring now to FIG. 5, in an alternate embodiment of the invention, the correlating step 39 of FIG. 3 produces a cross correlation function for each specific position of the second edit point. The CCF scheme begins, i.e., with n=0, at step 54 by calculating the magnitude products of corresponding samples in the correlation windows. In particular, the magnitude of the first sample in the correlation window following the first edit point is multiplied by the magnitude of the first sample in the correlation window following the second edit point. This step is represented in equation (2) as:

$$S_1(j)S_2(j+n) \quad (4)$$

Similarly, magnitude products are produced for sets of corresponding samples in the correlation windows. By step 56, the magnitude products are added to a summation value to produce a cross correlation function for the specific position of the second edit point. The CCF scheme returns at step 58 to the method of FIG. 3 wherein the position of the second edit point is then shifted, i.e., n=1, to the next sample in the sample sequence. A CCF summation value is produced in this manner for each position of the second edit point along the sample sequence.

As discussed above, before the position of the second edit point is shifted to the next sample, a test is made to determine whether the "current" correlation value is better, i.e., represents a more acceptable splice point, than the "previous best correlation value ." If so, the "acceptable splice point" is equated with the "current" position of the second edit point and the "current" correlation value is equated with the "previous best correlation value." Thereafter, the position of the second edit point is shifted and a test is made to determine whether a predetermined number of samples have been tested. If not, then the plurality of samples in the correlation window following the first edit point are correlated with the plurality of samples in the correlation window following the "new" second edit point. This correlation scheme may be either the average magnitude difference function or the cross correlation function set forth in FIGS. 4 and 5, respectively. If the AMDF correlation scheme is utilized, then the position of the "acceptable splice point" is that position of the second edit point for which the AMDF is mimimized, i.e., the minimum "previous best correlation value." However, if the CCF scheme is utilized, then the position of the "acceptable splice point" is that position of the second edit point for which the CCF is maximized, i.e., the maximum "previous best correlation value."

Therefore, it can be seen that according to the present invention, a method is provided for determining an acceptable splice point in an audio signal which preserves the general waveshape thereof after an edit. In particular, the acceptable splice point in a given region is selected by judging the correlation between the samples to be spliced in with the samples which would have been in the sequence had there been no editing. It should also be appreciated that the correlation schemes discussed above can be "weighted," for example by assigning a greater weight to samples in the correlation windows which are closer to the first and second edit points. In this way, the values of the AMDF or the CCF depend more on such samples and are affected only minimally by the samples located at the end of the respective correlation windows.

The method for determining acceptable splice points according to the present invention is advantageous since it is relatively unaffected by noise and works well for signal fluctuations found in speech. By way of example only, this method may be used advantageously to delete or insert audio segments for implementing variable recall speed playback, or VRS. VRS speeds up audio playback by removing short sections of audio samples, and then splicing the remaining audio segments together. With the method of the present invention, the splicing together of audio segments produces an edited audio signal having little or no signal discontinuities between the edit points as shown in FIGURE 1d. The method of determining an acceptable splice point according to the present invention may also be used for other editing purposes, such as splicing words together in a recorded speech segment.

The method of the present invention is implemented by a standard electronic digital signal processing system having associated peripheral devices. Such a system includes a central processing unit, such as a 16-bit microprocessor, associated memory for storing control and supervisory programs for the system, and various input/output devices including a keyboard and display. Moreover, although in FIG. 2b the portions of the audio signal to be correlated are shown in analog form, the method of the present invention operates on either analog or digital samples. Therefore, the system also includes an analog-to-digital converter for converting the audio signal into a sequence of digital samples. As discussed above, the selection of the first and second edit points along the digital signal sequence can be effected by inputting various test parameters to the system via the keyboard during a prompting scheme. The correlation schemes discussed above are implemented via software routines stored in the memory associated with the central processing system. Such a system incorporating these and other features is believed well within the scope of the prior art and thus will not be discussed in detail.

Although the invention has been described and illustrated in detail, it is clearly understood that the same is by way of illustration and example only and is not to be taken by way of limitation. The spirit and scope of the present invention are to be limited only by the terms of the appended claims.

I claim:

1. A method for audio editing using a digital processing system including a central processing unit, an input device and an output device, comprising the steps of:
   (a) converting an audio signal received from the input device into a sequence of digital samples;
   (b) selecting first and second edit points along said sequence, said first edit point representing a nominal ending point of a first audio segment, said second edit point representing a nominal starting point of a second audio segment;
   (c) equating an acceptable splice point with the nominal starting point of said second audio segment;
   (d) initializing an average magnitude difference function (AMDF) correlation variable to a first value;
   (e) selecting a plurality of samples following said first and second edit points to define first and second correlation windows, respectively, following said first and second edit points;
   (f) assigning varying weights to said plurality, of samples in each of said first and second correlation windows according to the positions of the samples within the correlation window;
   (g) correlating the plurality of samples in the first correlation window following said first edit point with the plurality of samples in the second correlation window following said second edit point to produce a second value of the AMDF correlation variable;
   (h) determining whether the second value of the AMDF correlation variable is smaller than the first value of the AMDF correlation variable;
   (i) if the second value of the AMDF correlation variable is smaller than the first value of the AMDF correlation variable, equating said acceptable splice point with the position of the second edit point used during step (g), and equating the second value of the AMDF correlation variable with the first value of tne ADMF correLation variable;

(j) shifting the position of said second edit point to the next sample in said sequence;

(k) repeating steps (e)-(i) for a predetermined number of positions of said second edit point; and (l) splicing said acceptable splice point to said nominal ending point of said first audio segment.

2. The method for audio editing as described in claim 1 wherein the samples in said first and second correlation windows closest to said first and second edit points are assigned greater weights than the samples located in said first and second correlation windows away from said first and second edit points.

3. The method for audio editing as described in claim 1 wherein the step of correlating further includes the steps of:

(m) differencing a magnitude of a first sample in said first correlation window following said first edit point with a magnitude of a first sample in said second correlation window following said second edit point;and (n) determining an absolute value of this difference.

4. The method for audio editing as described in claim 3 further including the steps of:

(o) repeating the steps (m) and (n) for corresponding samples in said first and second correlation windows; and (p) summing each of said absolute values to produce said second value of the AMDF correlation variable.

5. A method for audio editing using a digital processing system including a central processing unit, an input device and an output device, comprising the steps of:

(a) converting an audio signal received from the input device into a sequence of digital samples;

(b) selecting first and second edit points along said sequence, said first edit point representing a nominal ending point of a first audio segment, said second edit point representing a nominal starting point of a second audio segment;

(c) equating an acceptable splice point with the nominal starting point of said second audio segment;

(d) initializing a cross correlation function (CCF) correlation variable to a first value;

(e) selecting a plurality of samples following said first and second edit points to define first and second correlation windows, respectively, following said first and second edit points;

(f) assigning varying weights to said plurality of samples in each of said first and second correlation windows according to the positions of the samples within the correlation window;

(g) correlating the plurality of samples in the first correlation window following said first edit point with the plurality of samples in the second correlation window following said second edit point to produce a second value of the CCF correlation variable;

(h) determining whether the second value of the CCF correlation variable is larger than the first value of the CCF correlation variable;

(i) if the second value of the CCF correlation variable is larger than the first value of the CCF correlation variable, equating said acceptable splice point with the position of the second edit point used during step g), and equating the second value of the CCF correlation variable with the first value of the CCF correlation variable;

(j) shifting the position of said second edit point to the next sample in said sequence;

(k) repeating steps (e)-(i) for a predetermined number of positions of said second edit point; and (l) splicing said acceptable splice point to said nominal ending point of said first audio segment.

6. The method for audio editing as described in claim 5 wherein the step of correlating further includes the step of:

(m) multiplying a magnitude of a first sample in said first correlation window following said first edit point with a magnitude of a first sample in said second correlation window following said second edit point to produce a product value.

7. The method for audio editing as described in claim 6 further including the step of:

(n) repeating step (m) for corresponding samples in said first and second correlation windows; and (o) summing each of said product values to produce said second value of the CCF correlation variable.

8. The method for audio editing as described in claim 5 wherein the samples in said first and second correlation windows closest to said first and second edit points are assigned greater weights than the samples located in said first and second correlation windows away from said first and second edit points.

* * * * *